UNITED STATES PATENT OFFICE 2,257,974

THIAZYL SULPHUR HALIDE

William E. Messer, Cheshire, Conn., assignor to United States Rubber Company, New York, N. Y., a corporation of New Jersey No Drawing. Application June 22, 1939, Serial No. 280,446

8 Claims. (Cl. 260—306)

This invention relates to a new class of compounds.

The new products are compounds comprising the group:

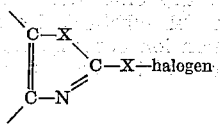

a preferred member being benzothiazyl sulphur chloride. X represents sulphur, selenium or tellurium.

They may be prepared by passing or incorporating the halogen into a suspension or slurry of a compound containing the group

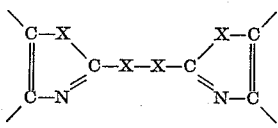

in an organic solvent such as benzene, tetrachlorethylene, carbon tetrachloride, etc., which is unreactive with the halogen, until substantially complete solution ensues and at least the theoretical amount of halogen has been absorbed. After heating to remove excess halogen, the hot solution is freed of insoluble matter that may be formed and cooled. By evaporating off the solvent or cooling the clear solution the present products may be recovered as residues or precipitates.

The following example illustrates the invention, in which benzothiazyl sulphur chloride

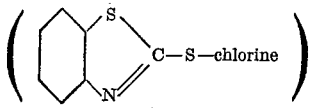

is prepared:

Example 33 grams (1 mole) 1,1'-dithio bis benzo thiazole (di-(benzothiazyl)-disulphide) are shaken with 200 ccs. dry carbon tetrachloride and dry chlorine passed in over liquid for 20 minutes with occasional shaking until all was dissolved. Heated to 70°±C. to drive off excess chlorine. Clear light reddish liquid is decanted from trace of tar and evaporated on water bath leaving 39+ grams of benzothiazyl sulphur chloride (theory=40 grams). It is a yellowish crystalline powder which tends to fume rapidly in moist air. Melting range is 132–135° C. and decomposes at about this point.

Analysis

|  | Found | Calculated |
|---|---|---|
|  | Per cent | Per cent |
| Nitrogen | 6.5 | 6.9 |
| Sulphur | 31.2 | 31.8 |

Instead of the benzothiazole disulphide, there may be used the corresponding disulphides of the naphthalene and anthracene series.

By using bromine, or iodine, the corresponding thiazyl sulphur bromide, and iodides may be prepared. Benzothiazyl sulphur bromide is an orange, reddish colored fuming powder, M. P. 80–100° C., with decomposition. Benzothiazyl sulphur iodide is a brown powder, M. P. 105–125° C., with decomposition.

Examples of other thiazyl sulphur halides within the scope of the invention are:

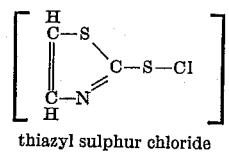
thiazyl sulphur chloride

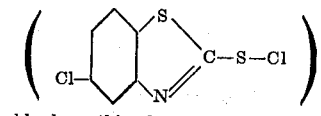
chlor-benzothiazyl sulphur chloride

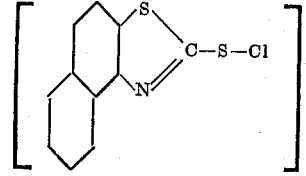
naphthothiazyl sulphur chloride and the corresponding bromides, and iodides.

The compounds may be used as intermediates, in the preparation of various derivatives of mercapto-aryl-thiazoles in which the halogen is replaced with suitable radicals, in the production of vulcanization accelerators. Other uses are also contemplated. When used as intermediates, they are best used freshly prepared and in solution.

Having thus described my invention, what I claim and desire to protect by Letters Patent is;

1. As new products, compounds having the general formula

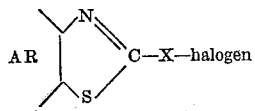

where AR represents an arylene group; where X is an element of the group consisting of divalent sulphur, selenium, and tellurium.

2. As new compounds, arylenethiazyl sulphur halides of the general formula

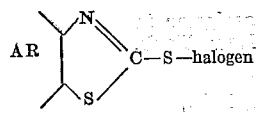

where AR represents an arylene group.

3. As new products, compounds having the general formula

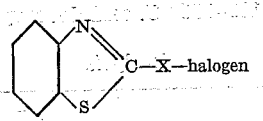

where X is an element of the group consisting of divalent sulphur, selenium, and tellurium.

4. As a new compound, benzothiazyl sulphur chloride.

5. A process of preparing arylenethiazyl sulphur halides which comprises reacting a suspension of a di(arylenethiazyl)-disulphide in an organic solvent inert to substantially dry halogen, with substantially dry halogen, until substantially complete solution of the suspension occurs.

6. A process of preparing arylenethiazyl sulphur chlorides which comprises reacting a suspension of a di(arylene-thiazyl)-disulphide in an organic solvent inert to substantially dry chlorine, with substantially dry chlorine, until substantially complete solution of the suspension occurs.

7. A process of preparing thiazyl sulphur halides which comprises reacting a suspension of a di(thiazyl)-disulphide in an organic solvent inert to substantially dry halogen, with substantially dry halogen, until substantially complete solution of the suspension occurs, and separating the thiazyl sulphur halide from the reaction mixture.

8. A process of preparing thiazyl sulphur halides which comprises reacting a suspension of a di(thiazyl)-disulphide in an organic solvent inert to substantially dry chlorine, with substantially dry chlorine, until substantially complete solution of the suspension occurs, and separating the thiazyl sulphur chloride from the reaction mixture.

WILLIAM E. MESSER.